US009980122B2

United States Patent
Lee et al.

(10) Patent No.: US 9,980,122 B2
(45) Date of Patent: May 22, 2018

(54) METHOD AND DEVICE FOR CONDUCTING DISCOVERY IN WIRELESS COMMUNICATION SYSTEM

(71) Applicant: LG ELECTRONICS INC., Seoul (KR)

(72) Inventors: Byungjoo Lee, Seoul (KR); Giwon Park, Seoul (KR); Dongcheol Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 15/113,803

(22) PCT Filed: Apr. 10, 2014

(86) PCT No.: PCT/KR2014/003108
§ 371 (c)(1),
(2) Date: Jul. 22, 2016

(87) PCT Pub. No.: WO2015/119329
PCT Pub. Date: Aug. 13, 2015

(65) Prior Publication Data
US 2017/0006456 A1 Jan. 5, 2017

Related U.S. Application Data

(60) Provisional application No. 61/937,441, filed on Feb. 7, 2014.

(51) Int. Cl.
*H04W 8/00* (2009.01)
*H04W 48/14* (2009.01)
(Continued)

(52) U.S. Cl.
CPC ........... *H04W 8/005* (2013.01); *H04L 5/0055* (2013.01); *H04L 61/6063* (2013.01);
(Continued)

(58) Field of Classification Search
None
See application file for complete search history.

(56) References Cited

U.S. PATENT DOCUMENTS 6,377,982 B1 * 4/2002 Rai ...................... H04L 12/4633
709/217
2005/0251549 A1 * 11/2005 Hlasny ................ H04L 12/2803
709/203
(Continued)

FOREIGN PATENT DOCUMENTS

| KR | 10-2013-0066905 | 6/2013 |
| KR | 10-2013-0079839 | 7/2013 |
| KR | 10-2013-0095983 | 8/2013 |

OTHER PUBLICATIONS

PCT International Application No. PCT/KR2014/003108, Written Opinion of the International Searching Authority dated Oct. 27, 2014, 14 pages.

*Primary Examiner* — Eunsook Choi
(74) *Attorney, Agent, or Firm* — Lee, Hong, Degerman, Kang & Waimey

(57) ABSTRACT

One embodiment of the present invention relates to a method for performing discovery from a first device supporting a Wi-Fi direct service, comprising the steps of: an application service platform (ASP) layer in the first device receiving, from a service layer, a SeekService method; the ASP layer generating a service hash based on the SeekService method; and transmitting a discovery request including the service hash to an access point (AP), wherein the discovery request is broadcasted to devices included in a subnet to which the first device belongs, via a port associated with the AP.

9 Claims, 12 Drawing Sheets

(51) Int. Cl.
*H04W 48/16* (2009.01)
*H04L 5/00* (2006.01)
*H04L 29/12* (2006.01)
*H04L 29/08* (2006.01)
*H04W 48/10* (2009.01)
*H04W 84/12* (2009.01)

(52) U.S. Cl.
CPC ........... *H04L 67/104* (2013.01); *H04W 48/10* (2013.01); *H04W 48/14* (2013.01); *H04W 48/16* (2013.01); *H04W 76/14* (2018.02); *H04W 84/12* (2013.01)

(56) References Cited

U.S. PATENT DOCUMENTS

| | | | |
|---|---|---|---|
| 2006/0259602 A1* | 11/2006 | Stewart | H04L 67/16 709/223 |
| 2011/0082940 A1* | 4/2011 | Montemurro | H04L 69/24 709/227 |
| 2012/0163246 A1* | 6/2012 | Wang | H04L 1/1832 370/277 |
| 2012/0243524 A1 | 9/2012 | Verma et al. | |
| 2013/0185447 A1 | 7/2013 | Nagawade et al. | |
| 2014/0044114 A1* | 2/2014 | Lee | H04W 76/023 370/338 |
| 2014/0293978 A1* | 10/2014 | Yang | H04W 8/005 370/338 |
| 2014/0337544 A1* | 11/2014 | Huang | G06F 13/385 710/63 |
| 2014/0351478 A1* | 11/2014 | Lee | H04W 4/08 710/303 |
| 2014/0351927 A1* | 11/2014 | Huang | G06F 21/44 726/19 |

\* cited by examiner

FIG. 12

| Field | Size (octets) | Value | Description |
|---|---|---|---|
| Opcode | 1 | 0x08 | Opcode as defined in Table 1 |
| Sequence number | 1 | variable | Sequence number is assigned at transmission time. |
| coordination_version | 1 | Variable | Coordination protocol version number |
| length | 2 | variable | Length of Discovery Information TLVs |
| Information Element TLVs | variable | Variable | IE TLVs | ic # METHOD AND DEVICE FOR CONDUCTING DISCOVERY IN WIRELESS COMMUNICATION SYSTEM

CROSS-REFERENCE TO RELATED APPLICATIONS

This application is the National Stage filing under 35 U.S.C. 371 of International Application No. PCT/KR2014/003108, filed on Apr. 10, 2014, which claims the benefit of U.S. Provisional Application No. 61/937,441, filed on Feb. 7, 2014, the contents of which are all hereby incorporated by reference herein in their entirety.

TECHNICAL FIELD

Following description relates to a wireless communication system, and more particularly, to a method of establishing discovery in Wi-Fi direct and an apparatus therefor.

BACKGROUND ART

Along with the recent development of information and communication technology, various wireless communication technologies have been developed. Among them, Wireless Local Area Network (WLAN) enables wireless access to the Internet based on radio frequency technology through a portable terminal such as a Personal Digital Assistant (PDA), a laptop computer, a Portable Multimedia Player (PMP) in a home, an office, or a specific service providing area.

The introduction of Wi-Fi Direct or Wi-Fi Peer-to-Peer (Wi-Fi P2P) is under discussion, as a direct communication technology that facilitates interconnection between devices without a wireless Access Point (AP) which is a basic requirement for a legacy WLAN system. According to Wi-Fi Direct, devices can be connected to each other without a complex establishment procedure and an operation for exchanging data at a communication rate offered by a general WLAN system can be supported to provide various services to users.

Recently, various Wi-Fi-enabled devices have been used. Among them, the number of Wi-Fi Direct-enabled devices which are Wi-Fi devices capable of communicating with each other without an AP is increasing. The Wi-Fi Alliance (WFA) has been discussing the introduction of a platform supporting various services (e.g., Send, Play, Display, Print, etc.) using a Wi-Fi Direct link. This may be referred to as Wi-Fi Direct Service (WFDS). According to WFDS, applications, services, etc. can be controlled or managed by a service platform called Application Service Platform (ASP).

DISCLOSURE OF THE INVENTION

Technical Task

A technical task of the present invention is to provide methods for a device already associated with an access point to perform discovery.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to a first technical aspect, a method of performing discovery by a first device supporting a Wi-Fi direct service, the method comprises receiving a SeekService method, which is received by an ASP (application service platform) layer of the first device from a service layer, generating a service hash, which is generated by the ASP layer based on the SeekService method, and transmitting a discovery request including the service hash to an AP (access point). In this case, the discovery request is broadcasted to devices included in a subnet to which the first device belongs thereto via a port associated with the AP.

To further achieve these and other advantages and in accordance with the purpose of the present invention, according to a second technical aspect, a first device supporting a Wi-Fi direct service includes a reception module and a processor. In the processor, an ASP (application service platform) layer of the first device receives a SeekService method from a service layer, generates a service hash based on the SeekService method, and transmits a discovery request including the service hash to an AP (access point). In this case, the discovery request is broadcasted to devices included in a subnet to which the first device belongs thereto via a port associated with the AP.

The first technical aspect and the second technical aspect of the present invention can include at least one of the following items.

The discovery request can include an IP header, a UDP (user datagram protocol) header, and a UDP datagram.

The UDP datagram can include an Opcode for indicating a discovery request and one or more information elements (IEs) related to a device to be discovered.

Each of the one or more IEs can be configured in a form of a type, a length and a value.

A value included in an IE among the one or more IEs can be configured by an attribute including a service hash field value.

A value included in an IE among the one or more IEs can be configured by an attribute including a service name field value and a service information request field value.

The method can further include the step of receiving a discovery response from a second device associated with the AP via the AP.

The discovery response can include an IP header, a UDP header, and a UDP datagram.

The UDP datagram can include an Opcode for indicating a discovery request and one or more IEs related to a device to be discovered.

Each of the one or more IEs can be configured in a form of a type, a length and a value.

A value included in an IE among the one or more IEs can be configured by an attribute including an advertised service descriptor field.

The method can further include the step of transmitting an ACK message including an Opcode and a sequence number in response to the discovery response.

Advantageous Effects

According to the present invention, a Wi-Fi Direct device can smoothly perform discovery in an infrastructure BSS mode as well. And, it is able to deliver information previously exchanged in a legacy layer 2 in an IP layer without changing a format in a manner of including various attributes in an UDP packet.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

FIGS. 9 to 14 are diagrams for explaining discovery according to embodiments of the present invention;

BEST MODE

Mode for Invention

Figure 1:
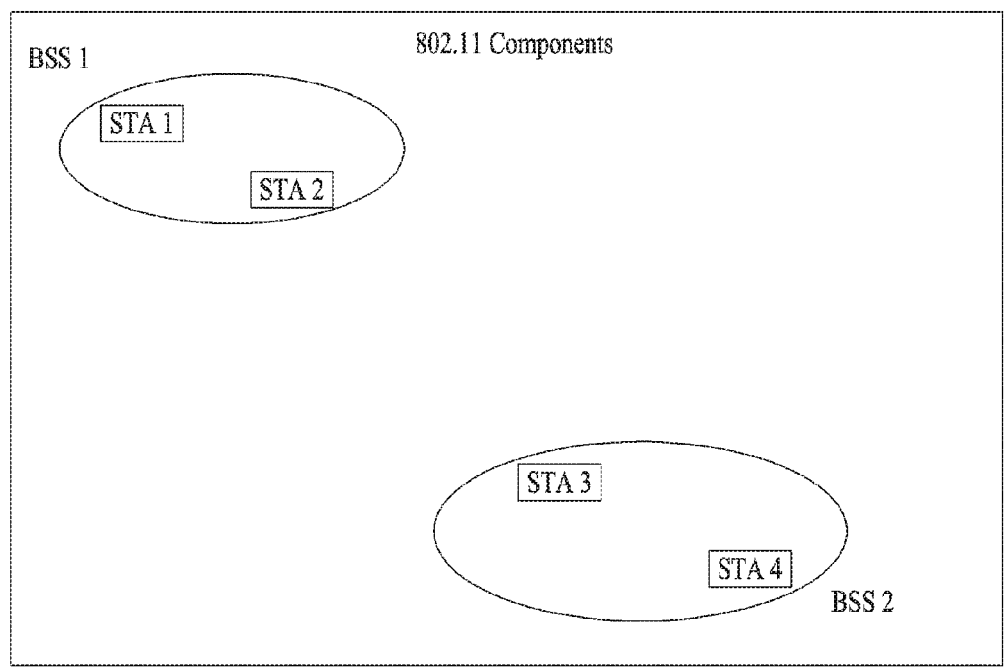
FIG. 1 illustrates an exemplary configuration of an Institute of Electrical and Electronics Engineers (IEEE) 802.11 system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, the present disclosure focuses on the IEEE 802.11 system. However, the technical features of the present invention are not limited thereto.

Architecture of Wireless Local Area Network (WLAN) System

FIG. 1 illustrates an exemplary configuration of an IEEE 802.11 system to which the present invention is applicable.

The IEEE 802.11 architecture may include a plurality of components. A WLAN that supports Station (STA) mobility transparent to higher layers may be provided through interaction between the components. A Basic Service Set (BSS) is a basic building block of an IEEE 802.11 WLAN. FIG. 1 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it can no longer communicate directly with other members of the BSA.

An Independent Basic Service Set (IBSS) is the most basic type of BSS in the IEEE 802.11 WLAN. For example, a minimum IBSS includes only two STAs. A BSS, BSS1 or BSS2 which is the most basic type without other components in FIG. 1 may be taken as a major example of the IBSS. This configuration may be realized when STAs communicate directly. Because this type of WLAN is often formed without pre-planning for only as long as the WLAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

In addition, FIG. 1 illustrates components such as a Distribution System (DS), a Distribution System Medium (DSM), an Access Point (AP), etc.

In a WLAN, PHYsical layer (PHY) limitations determine a direct station-to-station distance that may be supported. For some networks, this distance may be sufficient, whereas for other networks, communication between STAs farther from each other may be required. To support increased coverage, a DS may be configured.

An architectural component used to interconnect BSSs is the DS. Instead of existing independently, a BSS may also form a component of an extended form of a network that is built with multiple BSSs.

The DS is a logical concept and may be defined by characteristics of the DSM. In this regard, IEEE 802.11 logically separates the Wireless Medium (WM) from the DSM. Each logical medium is used for a different purpose by a different component of the architecture. The IEEE 802.11 definitions neither preclude, nor demand, that the multiple media be either the same or different. Recognizing that the multiple media are logically different is a key to understanding of the flexibility of the architecture. The IEEE 802.11 WLAN architecture may be realized in various manners and may be specified independently of the physical characteristics of any specific implementation.

The DS may support mobile devices by providing logical services needed to handle address-to-destination mapping and seamless integration of multiple BSSs.

An AP is an entity that provides access to the DS to associated STAs in addition to acting as an STA. Data may move between a BSS and the DS via an AP. For example, STA2 and STA3 illustrated in FIG. 1 provide access to the DS to associated STAs (STA1 and STA4), having STA functionality. Since all APs are basically STAs, they are addressable entities. Addresses used by an AP for communication on the WM and DSM are not necessarily the same.

Data that one of STAs associated with the AP transmits to an STA address of the AP may always be received at an uncontrolled port and processed by an IEEE 802.1X port access entity. If a controlled port is authenticated, transmission data (or frames) may be transmitted to the DS.

Layer Architecture

In the WLAN system, an operation of an STA may be described from the perspective of layer architecture. Layer architecture in terms of device configuration may be implemented by a processor. An STA may have a plurality of layer structures. For example, the 802.11 standard specifications mainly deal with the Medium Access Control (MAC) sublayer of the Data Link Layer (DLL) and the PHY layer. The PHY layer may include a Physical Layer Convergence Protocol (PLCP) entity and a Physical Medium Dependent (PMD) entity. Both the MAC sublayer and the PHY layer conceptually include management entities, called MAC Sublayer Management Entity (MLME) and PHY Layer Management Entity (PLME). These entities provide layer management service interfaces through which layer management functions may be invoked.

In order to provide a correct MAC operation, a Station Management Entity (SME) is present within each STA. The SME is a layer-independent entity that may be viewed as residing in a separate management plane or as residing off to the side. The exact functions of the SME are not specified herein, but in general this entity may be viewed as being responsible for such functions as gathering of information about layer-dependent statuses from various Layer Management Entities (LMEs) and similarly setting of the values of layer-specific parameters. The SME may typically perform such functions on behalf of general system management entities and may implement standard management protocols.

The foregoing entities interact in various ways. For example, the entities may interact with each other by exchanging GET/SET primitives. A primitive refers to a set of elements or parameters related to a specific purpose. An XX-GET.request primitive is used to request the value of a given MIB attribute (management information-based attribute information). An XX-GET.confirm primitive returns an appropriate MIB attribute value if Status="success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status="success," and otherwise, it returns an error condition in the Status field. If this MIB attribute implies a specific action, then this confirms that the action was performed.

The MLME and the SME may exchange various MLME_GET/SET primitives via an MLME_SAP (Service Access Point). Also, various PLMEM_GET/SET primitives may be exchanged between the PLME and the SME via a PLME_SAP and between the MLME and the PLME via an MLME-PLME_SAP.

Evolution of WLAN

The IEEE 802.11 group is working on the standardization of WLAN. IEEE 802.11a and IEEE 802.11b use an unlicensed band in 2.4 GHz or 5 GHz. IEEE 802.11b offers a data rate of 11 Mbps, whereas IEEE 802.11a offers a data rate of 54 Mbps. IEEE 802.11g offers 54 Mbps by applying Orthogonal Frequency Division Multiplexing (OFDM) in 2.4 GHz and IEEE 802.11n offers 300 Mbps by applying Multiple Input Multiple Output-OFMD (MIMO-OFDM). IEEE 802.11n supports a channel bandwidth of up to 40 MHz. In this case, it provides a data rate of 600 Mbps.

In a WLAN environment conforming to IEEE 802.11e, a Direct Link Setup (DLS)-related protocol is based on the premise of a Quality BSS (QBSS) meaning that a BSS supports Quality of Service (QoS). In the QBSS, an AP as well as a non-AP STA is a Quality AP (QAP) supporting QoS. However, even though a non-AP STA is a Quality STA (QSTA) supporting QoS in a current commercialized WLAN environment (e.g., conforming to IEEE 802.11a/b/g), most of APs are legacy APs that do not support QoS. As a result, the DLS service is not available even to a QSTA in the current commercialized WLAN environment.

Tunneled Direct Link Setup (TDLA) is a new wireless communication protocol proposed to overcome this limitation. Although the TDLS does not support QoS, it enables QSTAs to establish direct links even in the current commercialized IEEE 802.11a/b/g WLAN environment and also even in Power Save Mode (PSM). Accordingly, the TDMS specifies an overall procedure for enabling QSTAs to establish direct links even in a BSS managed by a legacy AP. Hereinbelow, a wireless network supporting the TDLS is referred to as a TDLS network.

Wi-Fi Direct Network

A legacy WLAN mainly deals with operations of an infrastructure BSS in which a wireless AP functions as a hub. An AP is responsible for supporting the PHY layer for wireless/wired connectivity, routing for devices in a network, and providing a service to add/remove a device to/from a network. In this case, devices of the network are connected to each other via the AP, not directly.

Standardization of Wi-Fi Direct as a technology supporting direct connectivity between devices is under discussion.

Figure 2:
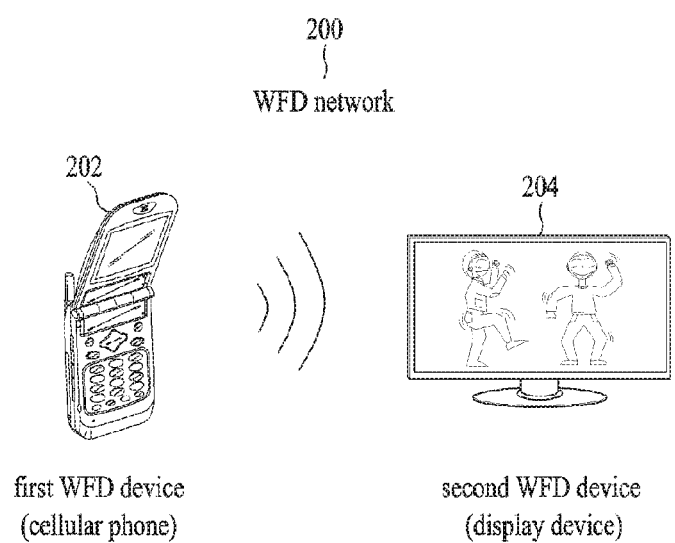
FIG. 2 illustrates an exemplary Wireless Fidelity (Wi-Fi) Direct network.

FIG. 2 illustrates an exemplary Wi-Fi Direct network. The Wi-Fi Direct network, which was proposed by the Wi-Fi Alliance (WFA), enables Wi-Fi devices to conduct Device-to-Device (D2D) (or Peer-to-Peer (P2P)) communication without joining a home network, an office network, and a hotspot network. Hereinafter, Wi-Fi Direct-based communication will be referred to as WFD D2D communication (shortly D2D communication) or WFD P2P communication (shortly, P2P communication). Also, a WFD P2P-enabled device will be referred to as a WFD P2P device, or shortly a P2P device.

Referring to FIG. 2, a WFD network 200 may include one or more Wi-Fi devices, for example, a first WFD device 202 and a second WFD device 204. The WFD devices include Wi-Fi-enabled devices such as a display device, a printer, a digital camera, a projector, and a smartphone. Also, the WFD devices include a non-AP STA and an AP STA. In the illustrated example, the first WFD device 202 is a portable phone and the second WFD device 204 is a display device. In the WFD network, WFD devices may be connected directly to each other. Specifically, P2P communication may refer to direct setup of a signal transmission path between two WFD devices without intervention of a third device (e.g., an AP) or a legacy network (e.g., connection to a WLAN via an AP). The signal transmission path established directly between the two WFD devices may be limited to a data transmission path. For example, P2P communication may mean transmission of data (e.g., audio/video/text information, etc.) between a plurality of non-AP STAs without intervention of an AP. A signal transmission path for control information (e.g., resource allocation information for P2P setup, wireless device identification information, etc.) may be established directly between WFD devices (e.g., between a non-AP STA and a non-AP STA or between a non-AP STA and an AP), between two WFD devices (e.g., a non-AP STA and a non-AP STA) via an AP, or between an AP and a WFD device (e.g., between an AP and non-AP STA #1 or between an AP and non-AP STA #2).

Figure 3:
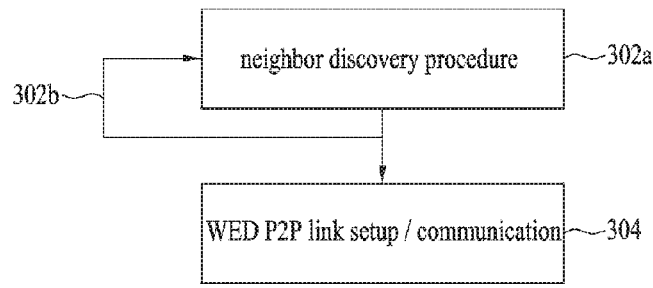
FIG. 3 is a flowchart illustrating an operation for configuring a Wi-Fi Direct network.

FIG. 3 is a flowchart illustrating an operation for configuring a WFD network.

Referring to FIG. 3, the operation for configuring a WFD network may be divided largely into two procedures. One of the procedures is a Neighbor Discovery (ND) procedure (S302a) and the other is a P2P link setup and communication procedure (S304). A WFD device (e.g., the WFD device 202 in FIG. 2) may discover another neighbor WFD device (e.g., the WFD device 204 in FIG. 2) within its (wireless) coverage and may acquire information required for association, for example, pre-association with the WFD device. Herein, pre-association may mean Layer 2 (L2) pre-association in a radio protocol. The information required for pre-association may include, for example, identification information about the neighbor WFD device. The ND procedure may be performed on an available radio channel basis (S302b). Then, the WFD device 202 may perform the WFD P2P link setup/communication procedure with the other WFD device 204. For example, after the WFD device 202 is associated with the neighbor WFD device 204, the WFD device 202 may determine whether the WFD device 204 satisfies a service requirement of a user. For this purpose, the WFD device 202 may search for the WFD device 204 after the L2 pre-association with the WFD device 204. If the WFD device 204 does not satisfy the user's service requirement, the WFD device 202 may release the L2 association with the WFD device 204 and then may set up L2 association with another WFD device. On the other hand, if the WFD device 204 satisfies the user's service requirement, the two WFD devices 202 and 204 may transmit and receive signals via a P2P link.

Figure 4:
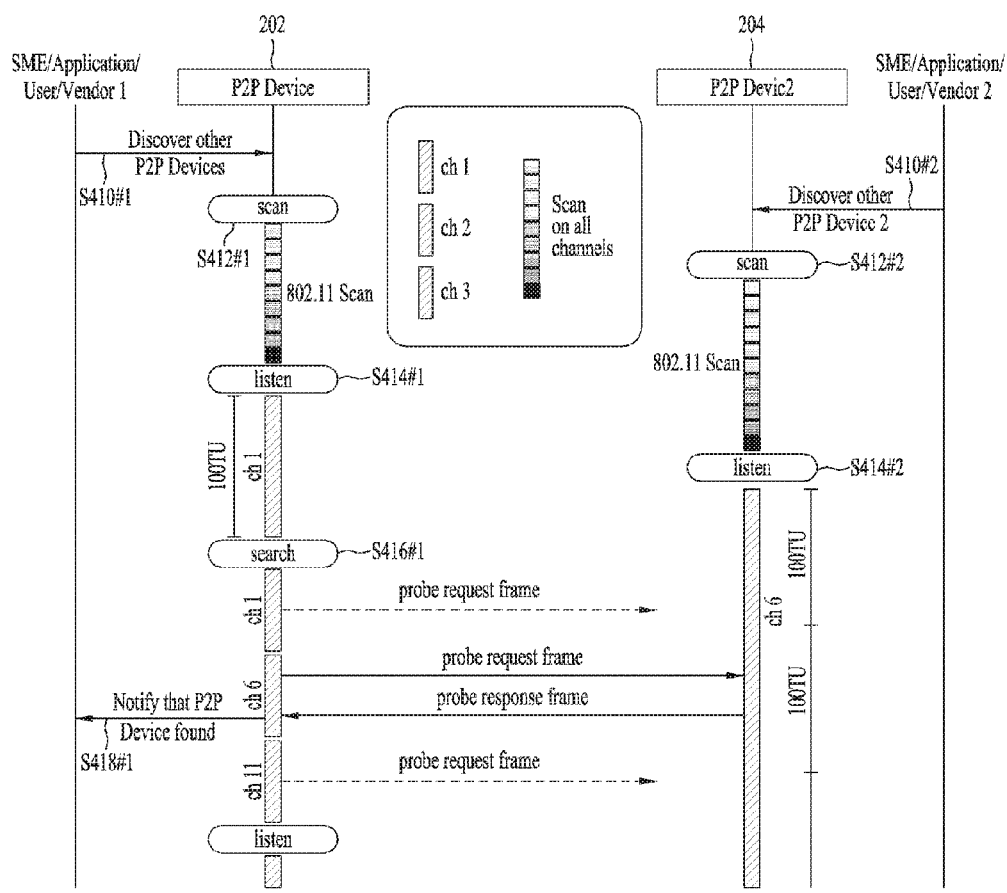
FIG. 4 is a diagram illustrating a signal flow for a neighbor discovery procedure.

FIG. 4 is a diagram illustrating a signal flow for the ND procedure. The example of FIG. 4 may be understood as illustrating an operation between the WFD devices 202 and 204 illustrated in FIG. 3.

Referring to FIG. 4, the ND procedure of FIG. 3 may be initiated by a command from an SME/application/user/vender (S410). The ND procedure may be divided into a scan phase (S412) and a find phase (S414 and S416). The scan phase (S412) includes an operation for scanning all available radio channels according to IEEE 802.11. Thus, a P2P device may detect a best operation channel. The find phase (S414 and S416) includes listen state (S414) and search state (S416), and the P2P device repeatedly alternates between the listen state (S414) and the search state (S416). The P2P devices 202 and 204 perform active search using a probe request frame in the search state (S416) and may limit a search range to social channels of channels 1, 6, and 11 (e.g., 2412, 2437, and 2462 MHz), for fast search. Also, the P2P devices 202 and 204 select only one of the three social channels and are kept in a reception state in the listen state (S414). Upon receipt of a probe request frame in the search state from the other P2P device (e.g., 202), the P2P device (e.g., 204) replies to the transmitting P2P device with a probe response frame. A random listen state time may be given (e.g., 100, 200, or 300 Time Units (TUs)). The P2P devices may tune to a common channel by repeating the search state and the reception state. After a P2P device discovers another P2P device, the P2P device may discover/exchange a device type, a manufacturer, or a familiar device name using a probe request frame and a probe response frame in order to be selectively associated with the other P2P device. When the P2P device discovers a neighbor P2P device and acquires necessary information from the discovered P2P device by the ND procedure, the P2P device (e.g., 202) may notify the SME/application/user/vendor of the discovery of the P2P device (S418).

At present, P2P communication is used mainly for semi-static communication such as remote printing, photo sharing, etc. Along with the proliferation of Wi-Fi devices and location-based services, P2P communication has gained increasing popularity. For example, it is expected that P2P communication will be used for social chatting (e.g., recognition of a neighbor wireless device and transmission and reception of information to and from the neighbor wireless device by a wireless device subscribed to Social Network Service (SNS)), location-based advertisement, location-based news broadcasting, and game interaction between wireless devices. For the convenience's sake, these P2P applications will be referred to as new P2P applications.

Figure 5:
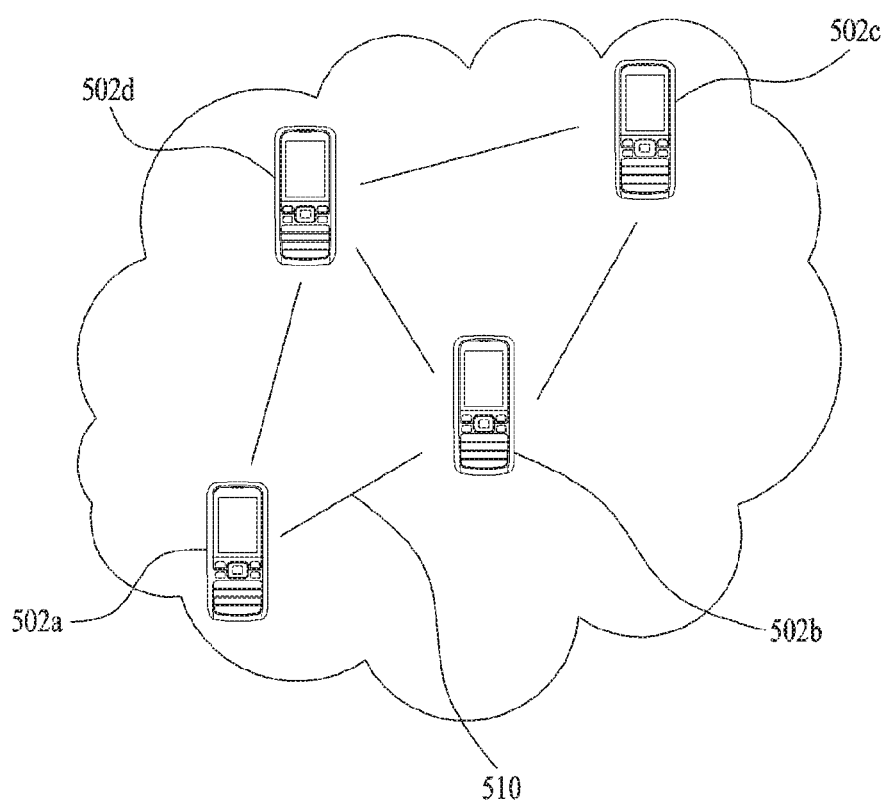
FIG. 5 is a view referred to for describing a new aspect of a Wi-Fi Direct network.

FIG. 5 illustrates a new aspect of a WFD network.

The example of FIG. 5 may be understood as a WFD network aspect in the case where a new P2P application (e.g., social chatting, location-based service, and game interaction) is used.

Referring to FIG. 5, a plurality of P2P devices 502a to 502d perform P2P communication (510) in the WFD network. A P2P device(s) that forms the WFD network may be often changed due to movement of the P2P devices(s), or the WFD network may be generated or deleted dynamically/in a short term. As described above, the new P2P applications are characterized in that P2P communication may be conducted and terminated dynamically/in a short term between a large number of P2P devices in a densely populated network environment.

Wi-Fi Direct Service (WFDS)

WFD is a network connectivity standard technology that defines even link-layer operations. Because no standard is defined for an application operating in a higher layer of a link configured by WFD, when WFD devices are connected to each other and then execute an application, it is difficult to support compatibility. To solve this problem, the WFA is working on standardization of an operation of a higher-layer application called WFDS.

Figure 6:
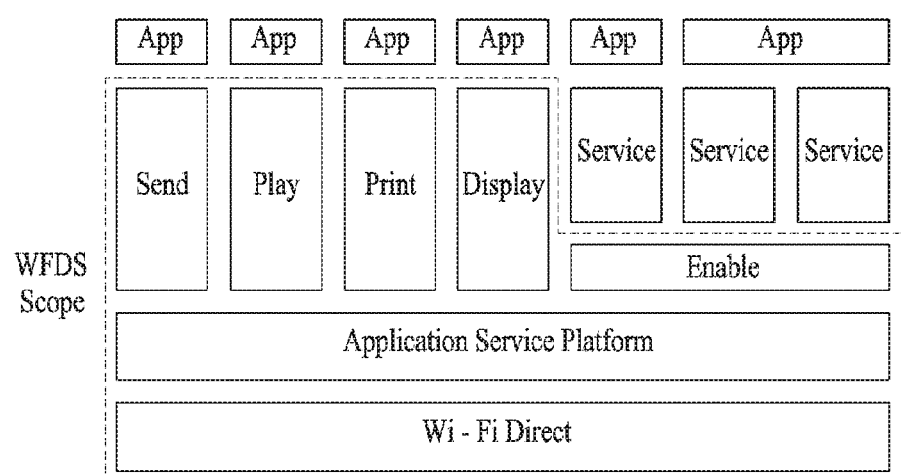
FIG. 6 is a view referred to for describing Wi-Fi Direct Service (WFDS) framework components.

FIG. 6 illustrates components of a WFDS framework.

Referring to FIG. 6, a Wi-Fi Direct layer is a MAC layer defined by the Wi-Fi Direct standard. The Wi-Fi Direct layer may include software compatible with the Wi-Fi Direct standard. A wireless connection may be configured by a PHY layer (not shown) compatible with the Wi-Fi PHY layer, under the Wi-Fi Direct layer. A platform called Application Service Platform (APS) is defined above the Wi-Fi Direct layer.

The ASP is a common shared platform and performs session management, service command processing, and control and security between ASPs between its overlying Application layer and its underlying Wi-Fi Direct layer.

A Service layer is defined above the ASP. The Service layer includes use case-specific services. The WFA defines four basic services, Send, Play, Display, and Print. Also, an Enable Application Program Interface (API) is defined to use an ASP common platform when a third party application other than the basic services is supported.

While Send, Play, Display, Print, or services defined by third party applications are shown in FIG. 6 as exemplary services, the scope of the present invention is not limited thereto. For example, the term "service" may mean any of services supporting Wi-Fi Serial Bus (WSB), Wi-Fi Docking, or Neighbor Awareness Networking (NAN), in addition to Send, Play, Display, Print, or the services defined by the third party applications.

Send is a service and application that can perform file transfer between two WFDS devices. Play is a service and application that enable sharing or streaming of Digital Living Network Alliance (DLNS)-based Audio/Video (A/V), photos, music, etc. between two WFDS devices. Print is a service and application that enable output of text and photos between a device having content such as text, photos, etc. and a printer. Display is a service and application that enable screen sharing between a Miracast source and a Miracast sink of the WFA.

The Application layer may provide a User Interface (UI), represent information as a human-perceivable form, and provide a user input to a lower layer.

Figure 7:
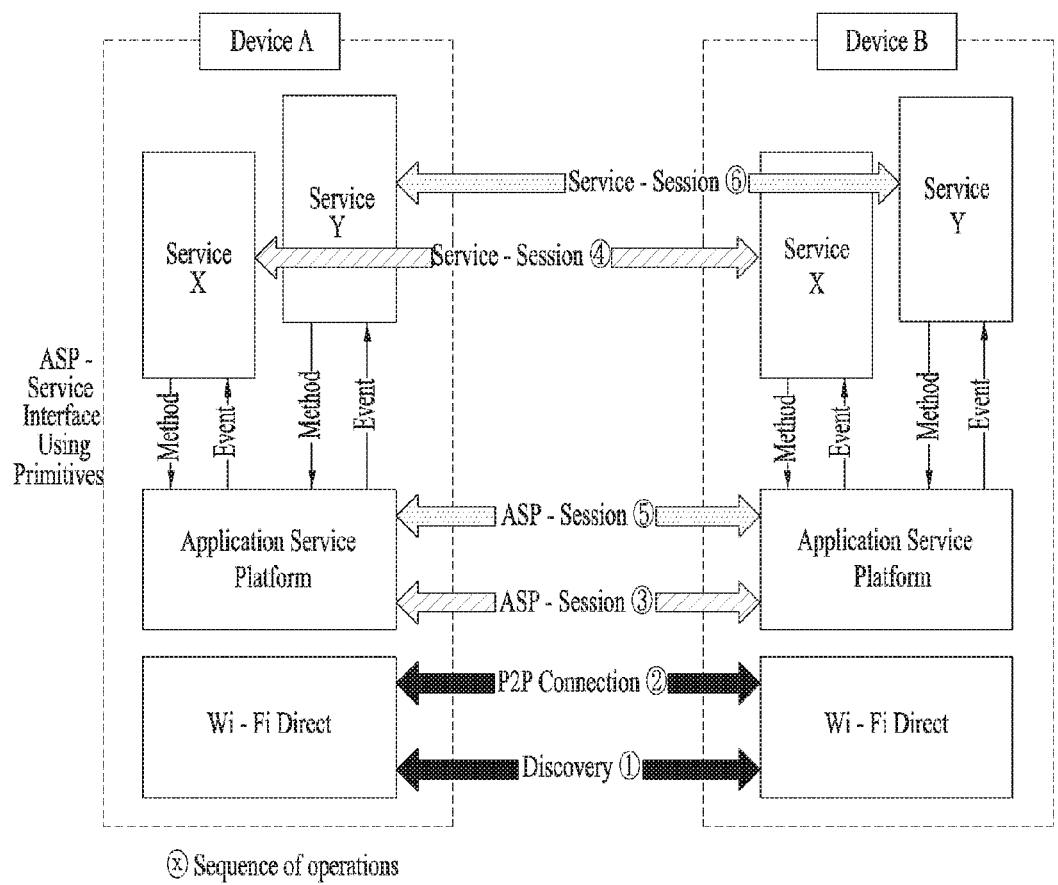
FIG. 7 is a view referred to for describing a WFDS operation.

FIG. 7 is a view referred to for describing a WFDS operation.

Referring to FIG. 7, it is assumed that there are two peer devices A and B.

An ASP is a logical entity that executes common functions required for services. These functions may include device discovery, service discovery, ASP-session management, connectivity topology management, security, etc.

An ASP-session is a logical link between the ASPs of devices A and B. To initiate the ASP-session, a P2P connection needs to be set up between the peer devices. The ASP may set up a plurality of ASP-sessions between the two devices. Each ASP-session may be identified by a session Identifier (ID) allocated by an ASP requesting the ASP-session.

A service is a logical entity that provides use case-specific functions to other services or applications using the ASP. A service of one device may communicate with matching services of one or more other devices using a service-specific protocol (it may be defined by a service standard and an ASP protocol).

An interface between the ASP and the service may be defined by Method and Event. Method represents an operation initiated by the service and parameters (or fields) of Method may include information about an operation to be performed. Event provides information from the ASP to the service.

If a user wants to use service X between device A and device B, the ASP of each of the devices generates an ASP-session dedicated to service X between the devices. Then, when the user wants to use service Y, a new ASP-session for the service is established.

Figure 8:
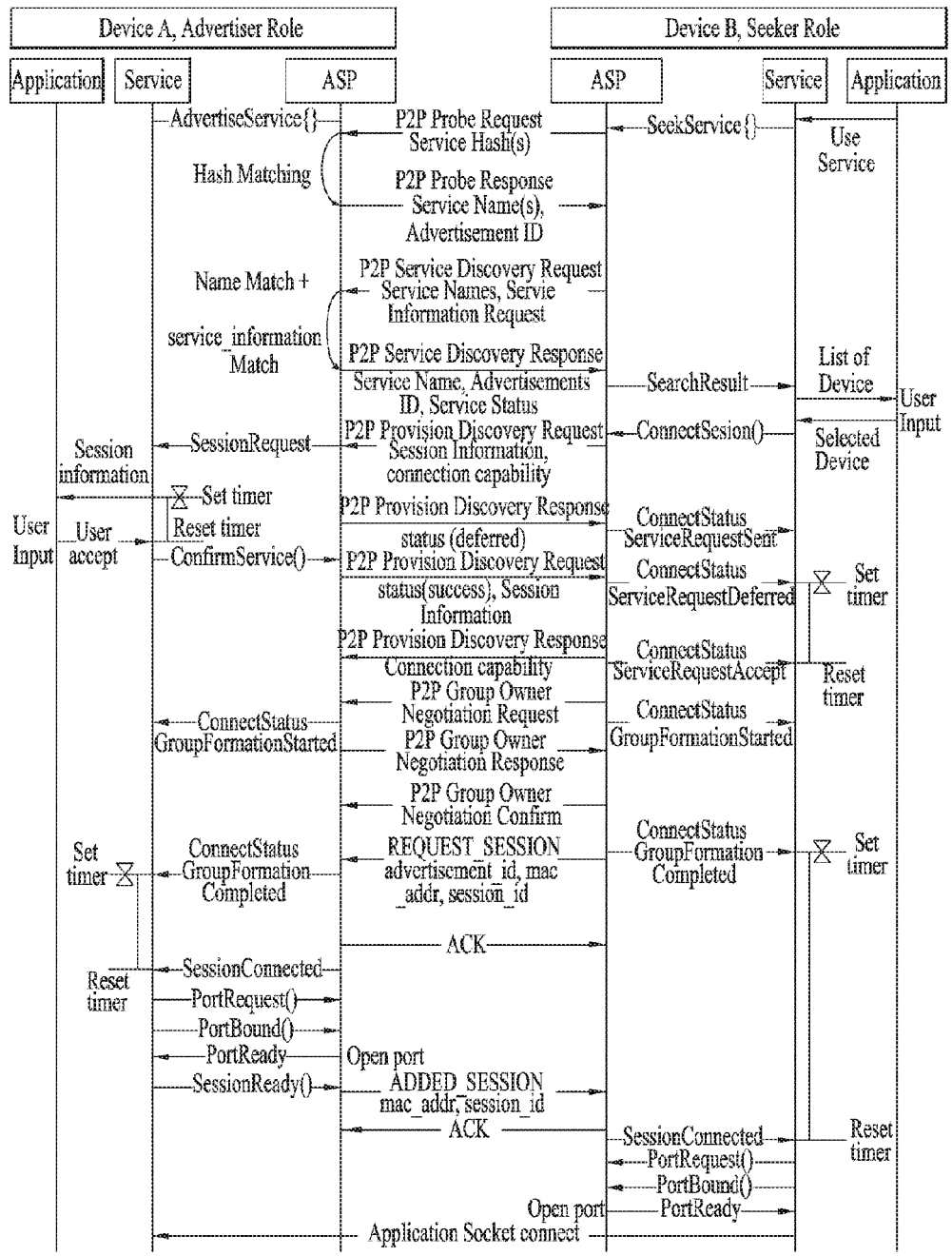
FIG. 8 is a view referred to for describing an Application Service Platform (ASP) setup sequence in WFDS.

FIG. 8 is a view referred to for describing an ASP session setup sequence in WFDS.

When operations are defined between two peer devices in WFDS, one of the peer devices may serve as an advertiser and the other peer device may serve as a seeker. The service seeker discovers a service advertiser(s) and when detecting an intended service, may request a connection to the service advertiser. In the example of FIG. 8, device A serves as an advertiser and device B serves as a service seeker.

The ASP session setup operation of FIG. 8 will be described in brief. A specific service of a WFDS device searches for another WFDS and service, requests the service, and sets up a Wi-Fi Direct connection, and then an application operates.

In FIG. 12, device A may advertise its service and wait for another device to discover the device. The ASP of device A may respond to another device based on information included an AdvertiseService( ) method provided by the Service layer.

Device B is a device that wants to search for a service and initiate the service. Device B searches for a device supporting the service, upon request of a higher application or a user. Upon receipt of information indicating a Use Service intention from the Application layer, the Service layer of device B may provide the information to the ASP by including information required for a SeekService( )method.

Therefore, the ASP of device B may transmit a probe request frame to another device. The service name of the service that it wants to detect or it may support may be included in a hashed form in the probe request frame.

Upon receipt of the probe request frame, device A attempts hash matching. If device A supports the service corresponding to the hash value, device A may transmit a probe response frame to device B. A service name, an advertisement ID value, etc. may be included in the probe response frame.

This procedure for exchanging a probe request frame and a probe response frame may be referred to as a device discovery procedure in which devices A and B are identified as WFDS devices and services supported by devices A and B are determined.

Additionally, devices A and B may exchange information about details of a specific service by a P2P service discovery procedure. For example, device B may transmit information such as a service name (a plurality of service names if support or non-support of a plurality of services are to be determined), a service information request, etc. to device A by a service discovery request message. Then if service information is matched, device A may indicate to device B that the service will be provided. For example, a service discovery response message may include information such as a service name, an advertisement ID, a service status, etc. The service status information indicates whether a service requested by a remote device is available from the service advertiser. This service discovery procedure may be performed by a Generic Advertisement Protocol (GAS) defined by IEEE 802.11u.

Upon completion of the operation requested by the Seek-Service( ) method requested by the Service layer, the ASP of device B may indicate its result (i.e. SearchResult) to the application and the user by the service.

Up to this time, a Wi-Fi Direct group has not been formed. When the user selects a service and the service performs a session connection (i.e., ConnectSession), a P2P group is formed. Herein, session information and connection capability information are exchanged by a provision discovery request and a provision discovery response.

The session information is hint information that roughly describes the service requested by the service-requesting device. For example, if file transfer is requested, the session information specifies the number of files and file sizes so that the other party may determine whether to accept or reject the service request. The connection capability information may be used in generating a group.

When device B transmits a provision discovery request message to device A, the ASP of device A transmits a session request (SessionRequest) including service information, etc. to the Service layer and the Service layer transmits the service information to the application/user. If the application/user determines to accept the session based on the session information, the application/user transmits a confirmation (ConfirmService( )) to the ASP through the Service layer.

During the time, the ASP of device A transmits a provision discovery response message to device B. Status may be set to Deferred in the provision discovery response message. This is done to indicate that the service is not accepted immediately and reception of a user input is awaited. Accordingly, the ASP of device B may indicate to the Service layer that the service request is deferred, while transmitting a ConnectStatus event.

Upon receipt of ConfirmService( ) at the ASP of device A, device A may perform a follow-on provision discovery procedure. That is, device A may transmit a provision discovery request message to device B. This may be referred to as the follow-on provision discovery procedure. This message may include service information together with information indicating that the status of the service is success. Therefore, the ASP of device B may indicate to the Service layer that the service request has been accepted, while transmitting a ConnectStatus event to the Service layer. Also, the ASP of device B may transmit a provision discovery response message to device A. The provision discovery response message may include connection capability information.

After the P2P provision discovery procedure, a P2P group is created and an L2 connection and an Internet protocol (IP) connection are established by the GO negotiation or invitation procedure. A detailed description of the GO negotiation procedure will not be given herein.

After the P2P connection or the IP connection is created by completion of the group generation, devices A and B transmit a REQUEST_SESSION message requesting a session by an ASP coordination protocol. The REQUEST_SESSION message may include an advertisement ID, a MAC address (mac_addr), and a session ID. The MAC address is an address of a P2P device. Device A may transmit an ACK message to device B in response to the REQUEST_SESSION message.

Upon receipt of the ACK message, device A may indicate the session connection to a higher-layer service/application and the Service layer may request port information about the session and bind the session with a port. Accordingly, the ASP may open the port (the ASP may open the port within a firewall) and indicate to the Service layer that the port is ready. The Service layer may indicate to the ASP that the session is ready (SessionReady( )).

Therefore, the ASP of device A transmits an ADDED_SESSSION message to the other device. The ADDED_SESSSION message may include the session ID and the MAC address information. Thus, the service may be uniquely identified. Upon receipt of the ADDED_SESSSION message, the ASP of device B may indicate the session connection to the Service layer and also may indicate to the Service layer that a port is ready (PortReady( )) through port request and port binding. The ASP may open the port within the firewall.

Subsequently, an application socket connection between the Service layers of devices A and B may be indicated. Since the ASP session is established in the above procedures, individual service-specific operations (for example, send, play, etc.) may be performed.

As mentioned earlier in FIG. 8, device discovery and service discovery defined in current Wi-Fi Direct are defined as transmission and reception of a P2P probe request/response frame and transmission and reception of a service discovery request/response frame, respectively. In particular, when a seeker and/or an advertiser are already connected with a specific identical AP, currently, a method of performing device discovery and/or service discovery has not been defined yet. If it is able to perform a discovery procedure in a state that a seeker and/or an advertiser access a specific identical AP, it may correspond to an evolved WFDS capable of performing a Wi-Fi direct service in an infrastructure mode. Hence, a method of performing device discovery and service discovery in a state that a seeker and/or an advertiser are already connected with an identical AP, i.e., a state that L2/L3 connection is established.

Embodiment 1

Figure 9:
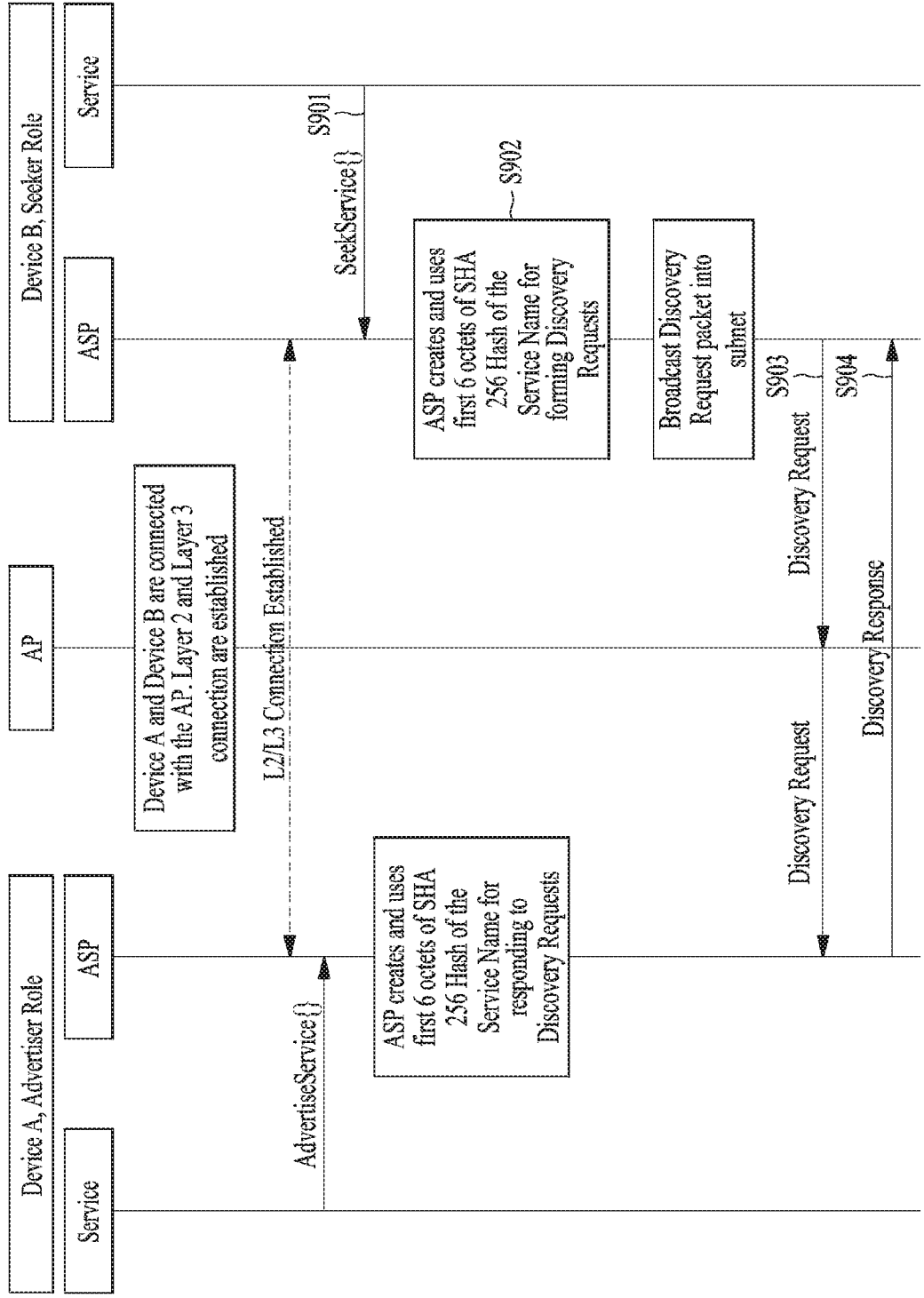

FIG. 9 shows an example of a device/service discovery procedure according to a first embodiment of the present invention. As mentioned in the foregoing description, assume that a device A (second device) corresponding to an advertiser and a device B (first device) corresponding to a seeker have already accessed an AP (L2/L3 connection established) in FIG. 9. An ASP layer of the seeker receives SeekerService method from a service layer [S901] generates a service hash based on the SeekerService method [S902] and can transmit a discovery request (packet) including the service hash to an AP [S903]. In this case, the discovery request can be broadcasted to devices included in a subnet to which the first device belongs thereto via a port associated with the AP. The port associated with the AP may correspond to a specific port (or an ASP coordination protocol port) which is opened in a manner that the seeker and/or the advertiser is connected with the AP. The discovery request can be broadcasted to the entire subnet via the port.

Subsequently, among devices, which have received the discovery request broadcasted to the subnet, a service-matched advertiser can transmit a discovery response including information on a device and/or a service in unicast via the AP.

Figure 10:
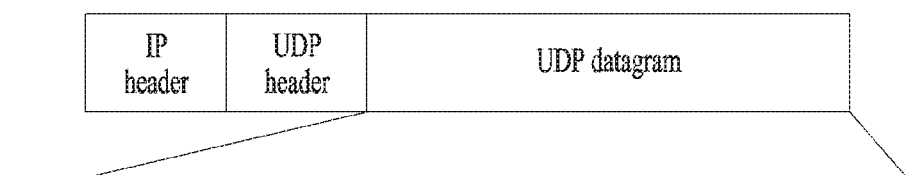

In the aforementioned first embodiment of the present invention, the discovery request and/or the discovery response can be generated at the top of an IP in a manner of being packetized using a (TCP or) UDP (user datagram protocol). In particular, the discovery request and/or the discovery response can include an IP header, a UDP header, and a UDP datagram. And, a UDP packet may correspond to an ASP CP (coordination protocol) or a new UDP discovery protocol. FIG. 10 shows an example for a case that the UDP packet is defined by the ASP CP. In FIG. 10, a table 1 corresponds to Table 1 in the following that ASP CP Op codes are defined.

TABLE 1

| Opcode | Message |
|---|---|
| 0 | REQUEST_SESSION |
| 1 | ADDED_SESSION |
| 2 | REJECTED_SESSION |
| 3 | REMOVE_SESSION |
| 4 | ALLOWED_PORT |
| 5 | VERSION |
| 6 | DEFERRED_SESSION |
| 7 | DISCOVERY_REQUEST |
| 8 | DISCOVERY_RESPONSE |
| 9-253 | Reserved |
| 254 | ACK |
| 255 | NACK |

Figure 11:
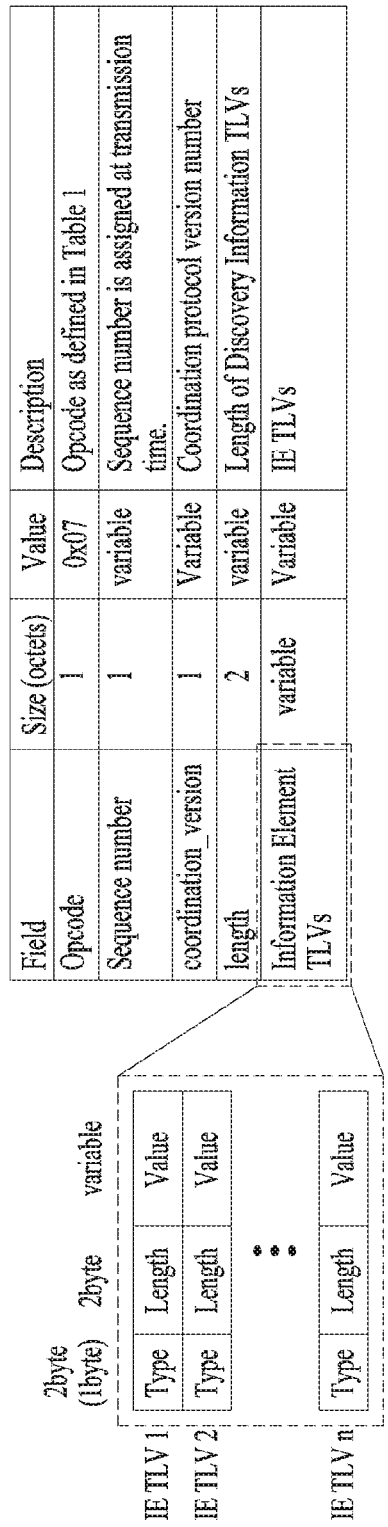

A configuration of the discovery request is explained in more detail with reference to FIG. 11. FIG. 11 shows an example for a case that a discovery request includes a UDP datagram and the UDP datagram corresponds to an ASP CP format. The UDP datagram can include an Opcode indicating a discovery request and one or more information elements (IEs) related to a device to be discovered. In this case, each of the IEs (IE TLV 1, IE TLV 2, and IE TLV n in FIG. 12) can be configured in a form of a type, a length and a value. As shown in Table 2 in the following, a type of an IE can be used for identifying an attribute. In Table 2, a format of an attribute corresponding to each type value may correspond to a format defined in Wi-Fi Direct Services (Draft) Technical Specification' or 'Wi-Fi Peer-to-Peer (P2P) Technical Specification Wi-Fi Direct Services Draft Addendum'.

TABLE 2

| Type Value | Notes |
|---|---|
| 0 | Status |
| 1 | Minor Reason Code |
| 2 | P2P Capability |
| 3 | P2P Device ID |
| 4 | P2P Manageability |
| 5 | Channel List |
| 6 | Notice of Absence |
| 7 | P2P Device Info |
| 8 | P2P Group Info |
| 9 | P2P Group ID |
| 10 | P2P Interface |
| 11 | Operating Channel |
| 12 | Invitation Flags |
| 13 | Out-of-Band Group Owner Negotiation Channel |
| 14 | Unused |
| 15 | Service Hash |
| 16 | Session Information Data Info |
| 17 | Connection Capability Info |
| 18 | Advertisement_ID Info |
| 19 | Advertised Service Info |

TABLE 2-continued

| Type Value | Notes |
|---|---|
| 20 | Session ID Info |
| 21 | Feature Capability |
| 22 | Persistent Group Info |
| 23 | Service Discovery Query Request |
| 24 | Service Discovery Query Response |
| others | Reserved |

Consequently, various attributes defined in 'Wi-Fi Direct Services (Draft) Technical Specification' or 'Wi-Fi Peer-to-Peer (P2P) Technical Specification Wi-Fi Direct Services Draft Addendum' (moreover, various attributes to be defined in a standard document related to the Wi-Fi Direct Services (Draft) Technical Specification' or 'Wi-Fi Peer-to-Peer (P2P) Technical Specification Wi-Fi Direct Services Draft Addendum) can be included in a discovery request as a TLV IE. For example, a value included in an IE can be configured by an attribute including a service hash field value. In other word, a service hash attribute shown in Table 3 in the following can be included in a discovery request in a TVL form.

TABLE 3

| Field | Size (octets) | Value | Description |
|---|---|---|---|
| Attribute ID | 1 | 21 | Identifying the type of P2P attribute |
| Length | 2 | 6xN | Length of the following field in the attribute. N represents the number of Service Hash field. |
| Service Hash(s) | 6xN | variable | Contains N Service Hash values. Each Service Hash is 6 octet array of hash of UTF-8 Service Name. |

As a different example, a value included in an IE can be configured by an attribute including a service name field and a service information request field. In particular, an ANQP query request shown in Table 4 in the following can be included in a discovery request in a TVL form.

TABLE 4

| Field | Size (octets) | Value | Description |
|---|---|---|---|
| Service Name Length | 1 | 0x00-0xFF | Length of Service Name. |
| Service Name | Service Name Length | Variable | Service name or prefix of the service name being searched for extra information |
| Service Information Request Length | 1 | 0x00-0xFF | Length of Service Information Request |
| Service Information Request | Variable | Variable | UTF-8 substring to search for inside service_information |

FIG. 12 shows an example of a discovery response. Similar to a discovery request, various attributes defined in 'Wi-Fi Direct Services (Draft) Technical Specification' or 'Wi-Fi Peer-to-Peer (P2P) Technical Specification Wi-Fi Direct Services Draft Addendum' (moreover, various attributes to be defined in a standard document related to the Wi-Fi Direct Services (Draft) Technical Specification' or 'Wi-Fi Peer-to-Peer (P2P) Technical Specification Wi-Fi Direct Services Draft Addendum) can be included in a discovery response as a TLV IE. In particular, an advertiser can deliver informations, which are used to be transmitted via a legacy P2P, via an IE TLV. As an example of an attribute included in a discovery response, there is an Advertised Service Info attribute. In other word, a value included in an IE can be configured by an attribute including an advertised service descriptor field shown in Table 5 in the following.

TABLE 5

| Field | Size (octets) | Value | Description |
| --- | --- | --- | --- |
| Attribute ID | 1 | 25 | Identifying the type of P2P attribute. |
| Length | 2 | variable | Length of the following fields in the attribute. |
| Advertised Service Descriptor(s) | Sum of all Advertised Service Descriptor(s) | | List of Advertised Service Descriptor(s). |

In Table 5, an Advertised Service Descriptor(s) field may follow a format shown in Table 6 in the following.

TABLE 6

| Field | Size (octets) | Value | Description |
| --- | --- | --- | --- |
| Advertisement ID | 4 | 0x00000000-0xFFFFFFFF | Advertisement ID of the local service |
| Service Config Methods | 2 | Config Method | The WSC Methods supported for the corresponding service. |
| Service Name Length | 1 | 0x00-0xFF | Length of Service Name. |
| Service Name | Variable | Variable | UTF-8 string defining the service |

Having received the discovery response, the first device can transmit ACK/NACK (e.g., ACK/NACK including an Op code and a sequence number) according to a WFDS ASP CP.

Embodiment 2

Figure 13:
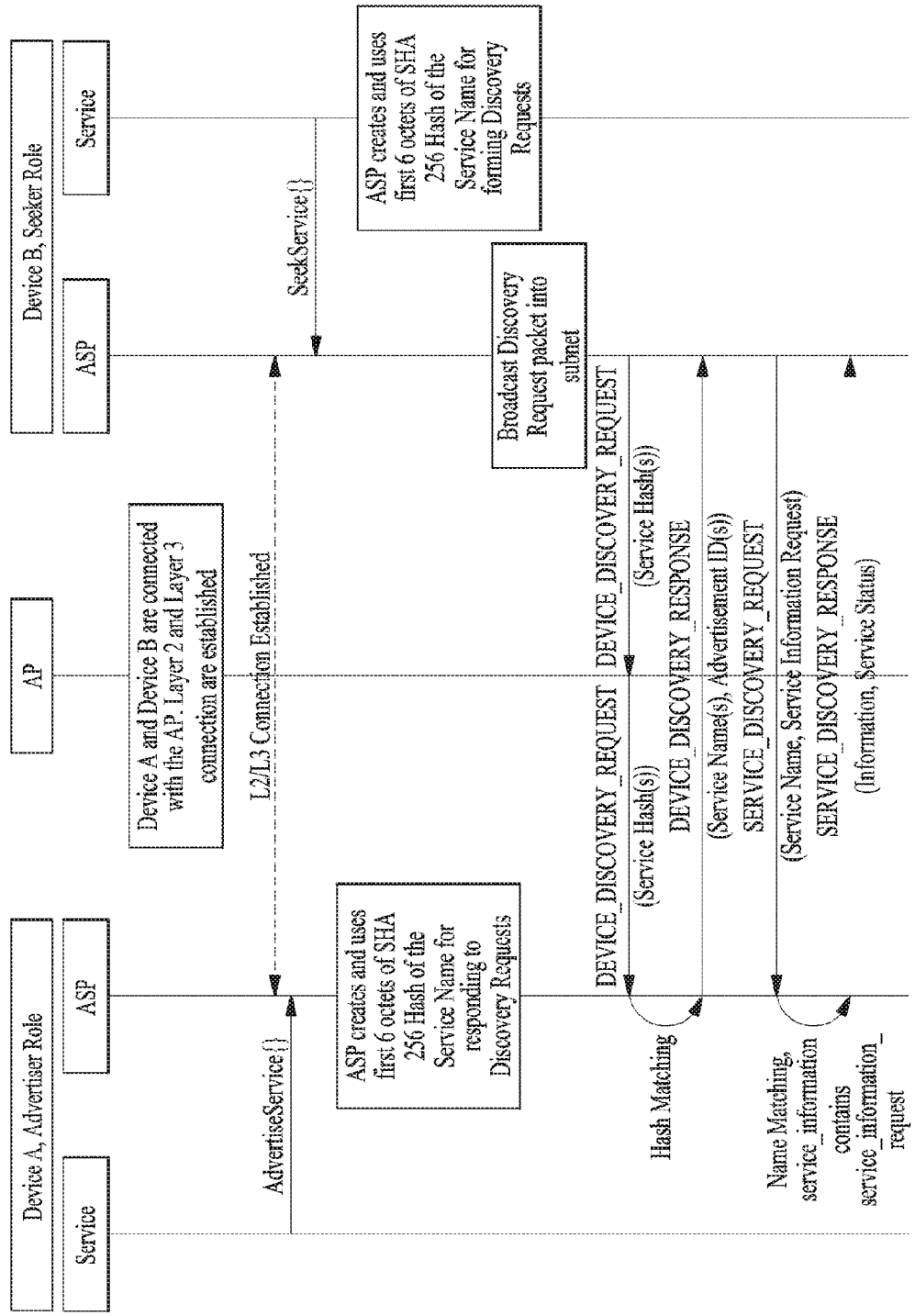
Figure 14:
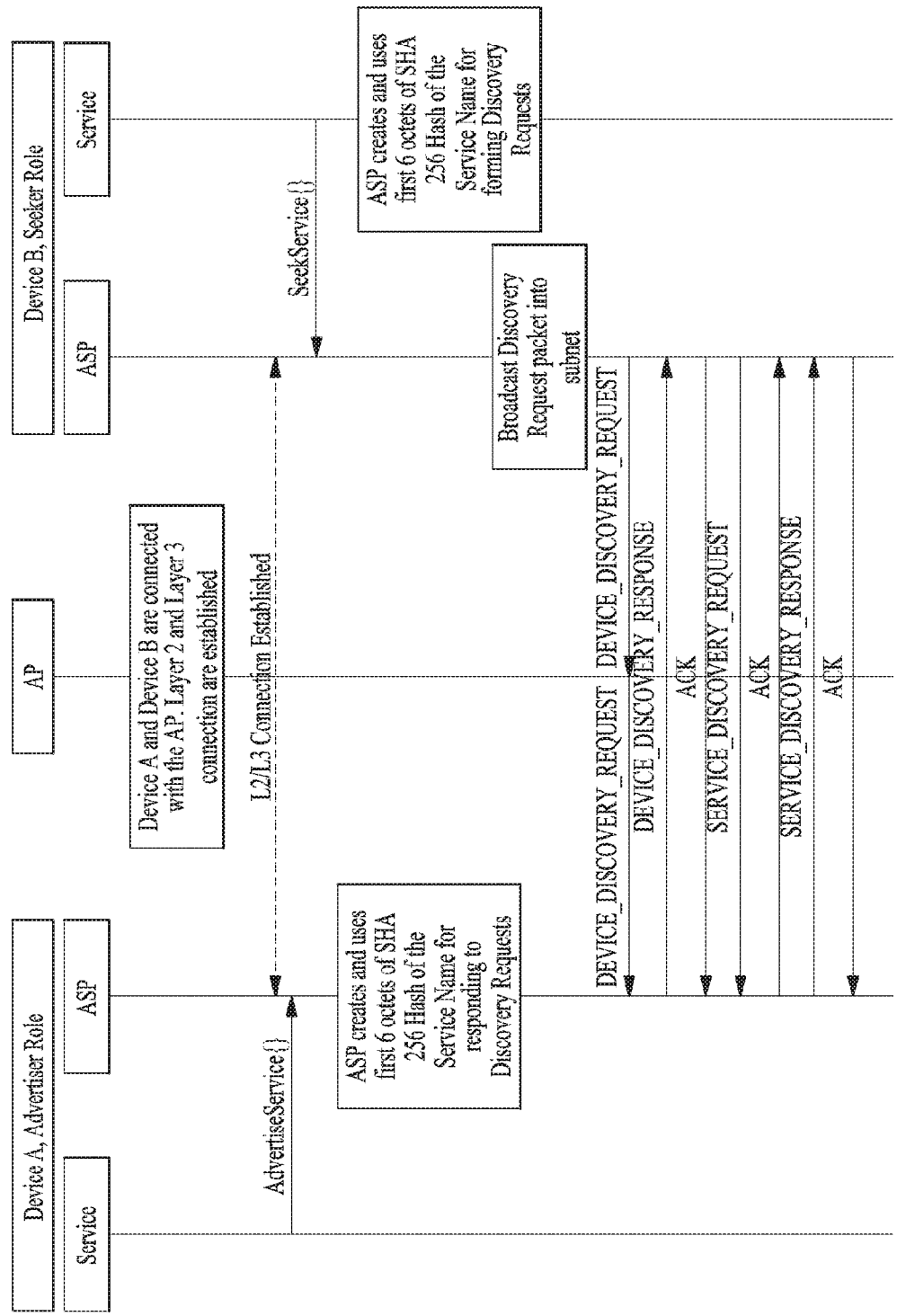

FIG. 13 shows an embodiment of a form that device discovery and service discovery are separated. FIG. 14 shows an example for a case that each device receiving a device discovery response, a service discovery request and a service discovery response transmits ACK according to an ASP CP.

In the embodiment 1, a discovery request is broadcasted and a discovery response is received in unicast. On the contrary, embodiment 2 has a difference of a concrete step in that a device discovery request is broadcasted and a response is received in response to the device discovery request and a service discovery request is transmitted and a service discovery response is received in response to the service discovery request. Yet, it may be able to apply the items mentioned earlier in the embodiment 1 can be applied as it is except the aforementioned difference. For example, a device discovery request/response and a service discovery request/response can be generated at the top of an IP in a manner of being packetized by a UDP. And, for example, a format of a service discovery request and a format of a service discovery response may be identical to a format of a service discovery request and a format of a service discovery response exemplarily shown in FIG. 11 and FIG. 12. Yet, in this case, it may be able to use Opcodes shown in Table 7 in the following.

TABLE 7

| Opcode | Message |
| --- | --- |
| 0 | REQUEST_SESSION |
| 1 | ADDED_SESSION |
| 2 | REJECTED_SESSION |
| 3 | REMOVE_SESSION |
| 4 | ALLOWED_PORT |
| 5 | VERSION |
| 6 | DEFERRED_SESSION |
| 7 | DEVICE_DISCOVERY_REQUEST |
| 8 | DEVICE_DISCOVERY_RESPONSE |
| 9 | SERVICE_DISCOVERY_REQUEST |
| 10 | SERVICE_DISCOVERY_RESPONSE |
| 11-253 | Reserved |
| 254 | ACK |
| 255 | NACK |

Figure 15:
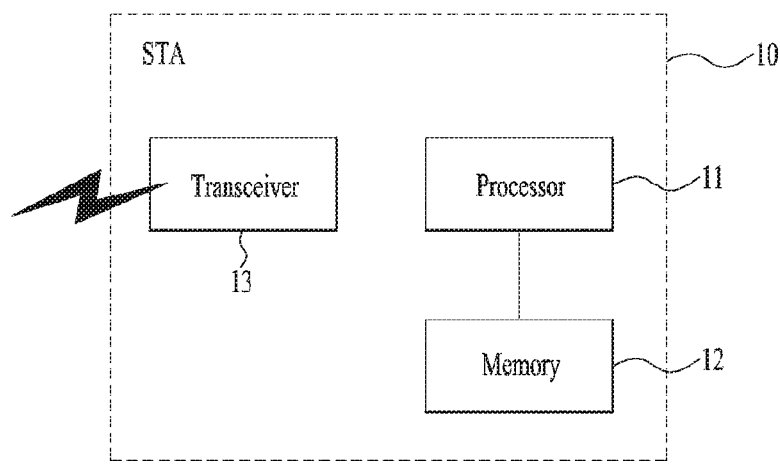
FIGS. 15 and 16 are block diagrams of a wireless apparatus according to an embodiment of the present invention.

FIG. 15 is a block diagram of a wireless apparatus according to an embodiment of the present invention.

The wireless apparatus 10 may include a processor 11, a memory 12, and a transceiver 13. The transceiver 13 may transmit/receive wireless signals. For example, the transceiver 13 may implement the PHY layer in an IEEE 802 system. The processor 11 may implement the PHY layer and/or the MAC layer in the IEEE 802 system, in electrical connection to the transceiver 13. The processor 11 can be configured to perform at least one operation selected from the group consisting of an application, a service and an ASP layer according to the aforementioned various embodiments of the present invention or can be configured to perform an operation related to a device operating as an AP/STA. Also, a module that performs an operation of the wireless apparatus according to the afore-described various embodiments of the present invention may be stored in the memory 12 and executed by the processor 11. The memory 12 may reside inside or outside the processor 11 and may be connected to the processor 11 by known means.

The detailed configuration of the wireless apparatus illustrated in FIG. 15 may be specified in such a manner that the above-described various embodiments of the present invention may be implemented independently or in combination of two or more. A redundant description is omitted for clarity.

Figure 16:
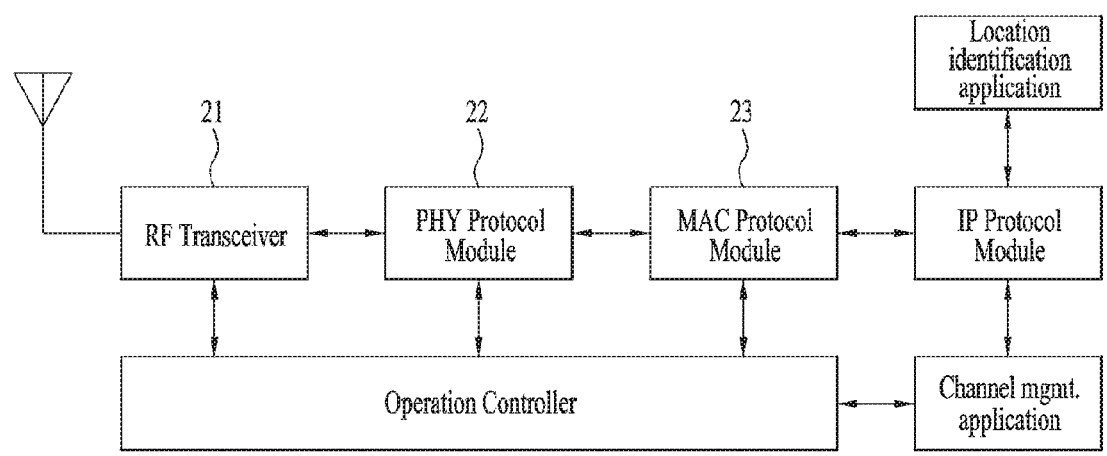

FIG. 16 is a diagram for a different configuration of a wireless device according to one embodiment of the present invention.

Referring to FIG. 16, an RF transceiver 21 moves information generated in a PHY protocol module 22 to an RF spectrum, performs filtering/amplification on the information, and transmit the information to an antenna. And, the RF transceiver moves an RF signal received from an antenna to a band capable of processing the RF signal by the PHY protocol module and performs a function of processing such a procedure as filtering and the like on the RF signal. The RF transceiver can further include a switching function for switching a receiving function and a transmitting function.

The PHY protocol module 22 performs such a processing as FEC encoding, modulating, and inserting an additional signal such as a preamble, a pilot signal and the like on a data required by a MAC protocol module 23 and delivers the data to the RF transceiver. At the same time, the PHY protocol module performs such a processing as demodulating, equalizing, FEC decoding, eliminating a signal added in a PHY layer, and the like on a signal received from the RF transceiver and delivers the data to the MAC protocol module. To this end, a modulator, a demodulator, an equalizer, a FEC encoder, a FEC decoder and the like can be included in the PHY protocol module.

In order to deliver or transmit data delivered from a higher layer to the PHY protocol module, the MAC protocol module 23 performs a necessary procedure or performs additional transmission to implement basic communication. To this end, the MAC protocol module processes data required by the higher layer to be appropriate for transmission and delivers or transmits the processed data to the PHY protocol module. And, the MAC protocol module processes data received from the PHY protocol module and delivers the processed data to the higher layer. The MAC protocol module also plays a role in processing a communication protocol by performing additional transmission and reception necessary for the data delivery.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the above-described various embodiments of the present invention have been described in the context of the IEEE 802.11 system, they are applicable to various mobile communication systems in the same manner.

What is claimed is:

1. A method of performing discovery by a first device supporting a Wi-Fi direct service, the method comprising:
receiving, by an ASP (application service platform) layer of the first device, a SeekService method from a service layer;
generating, by the ASP layer, a service hash based on the SeekService method; and
transmitting a discovery request containing the service hash to an AP (access point),
wherein the discovery request is broadcasted to devices contained in a subnet to which the first device belongs thereto via a port associated with the AP,
wherein the discovery request comprises an IP (Internet protocol) header, a UDP (user datagram protocol) header, and a UDP datagram,
wherein the UDP datagram comprises an Opcode for indicating the discovery request and one or more information elements (IEs) related to a device to be discovered,
wherein each of the one or more IEs is configured in a form of a type, a length and a value, and
wherein a value contained in an IE among the one or more IEs is configured by an attribute containing a service name field value and a service information request field value.

2. The method of claim 1, wherein another value contained in the IE among the one or more IEs is configured by an attribute containing a service hash field value.

3. The method of claim 1, further comprising:
receiving a discovery response from a second device associated with the AP via the AP.

4. The method of claim 3, wherein the discovery response comprises an IP header, a UDP header, and a UDP datagram.

5. The method of claim 4, wherein the UDP datagram of the discovery response comprises an Opcode for indicating the discovery request and one or more IEs related to a device to be discovered.

6. The method of claim 5, wherein each of the one or more IEs of the discovery response UDP datagram is configured in a form of a type, a length and a value.

7. The method of claim 6, wherein a value contained in an IE among the one or more IEs of the discovery response UDP datagram is configured by an attribute containing an advertised service descriptor field.

8. The method of claim 3, further comprising:
transmitting an ACK message containing an Opcode and a sequence number in response to the discovery response.

9. A first device supporting a Wi-Fi direct service, the first device comprising:
a reception module; and
a processor,
wherein an ASP (application service platform) layer of the processor receives a SeekService method from a service layer,
wherein the ASP layer generates a service hash based on the SeekService method, and transmits a discovery request containing the service hash to an AP (access point),
wherein the discovery request is broadcasted to devices contained in a subnet to which the first device belongs thereto via a port associated with the AP,
wherein the discovery request comprises an IP (Internet protocol) header, a UDP (user datagram protocol) header, and a UDP datagram,
wherein the UDP datagram comprises an Opcode for indicating the discovery request and one or more information elements (IEs) related to a device to be discovered,
wherein each of the one or more IEs is configured in a form of a type, a length and a value, and
wherein a value contained in an IE among the one or more IEs is configured by an attribute containing a service name field value and a service information request field value.

* * * * *